Nov. 12, 1957    M. KADOSCH ET AL    2,812,636
PROCESS AND DEVICE FOR DEFLECTING JETS
Filed Feb. 15, 1955
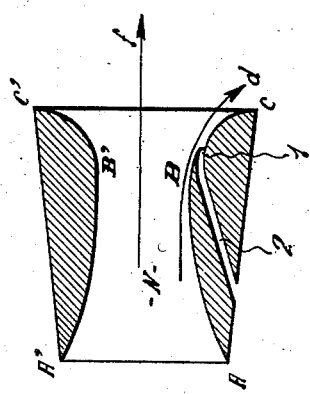
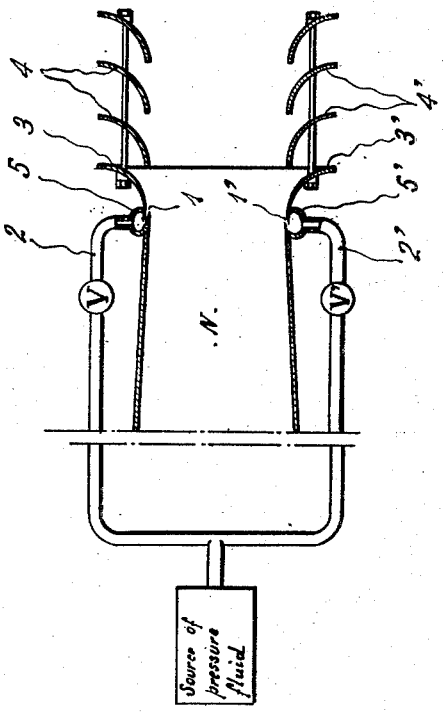
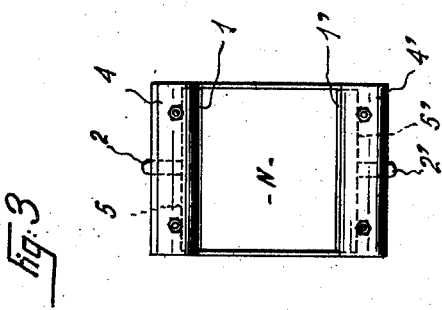
INVENTORS
Marcel Kadosch
Francois G. Paris
Jean H. Bertin
Raymond H. Marchal
By Watson, Cole, Grindle & Watson
ATTORNEYS

2,812,636

PROCESS AND DEVICE FOR DEFLECTING JETS

Marcel Kadosch, Paris, François G. Paris, Garches, Jean H. Bertin, Neuilly-sur-Seine, and Raymond H. Marchal, Paris, France, assignors to Societe Nationale d'Etude et de Construction de Moteurs d'Aviation, Paris, France, a French company Application February 15, 1955, Serial No. 488,366

Claims priority, application France June 16, 1950

3 Claims. (Cl. 60—35.55)

This application is a continuation-in-part of our co-pending application Serial No. 221,552, filed April 18, 1951.

The present invention relates to nozzles designed for forming a jet issuing therefrom in a general axial direction, and more particularly to propulsive nozzles of jet propulsion units.

An object of this invention is to provide improved means for deflecting the jet from the axis of the nozzle, either symmetrically threabout in order to spoil the thrust or dissymmetrically in order to create a lateral thrust component exerting a steering moment on the jet propulsion unit and therefore on the aircraft, missile or the like powered by said unit.

A further object of the invention is to provide controllable, jet deflecting means extending entirely outside of the normal, undeflected path of the jet so as not to interfere therewith when no deflection is desired.

A still further object of the invention is to provide such controllable, jet deflecting means which operates by means of an auxiliary flow of fluid injected into the boundary layers of the jet, in a direction generally parallel to the stream-lines of these layers, in order to further the point of separation of flow along an outwardly curved convex extension of the wall of the nozzle.

It has already been proposed to control the boundary layers of a flow, for example an air flow over an aircraft wing or the flow of a motive fluid along a curved wall say of a band, by blowing a fluid, into said flow, tangentially to the bounding surface, so as to accelerate the otherwise retarded boundary layers of the flow in order to prevent separation of this flow from this surface, or at least to displace the point of separation of flow further along the surface. Such a boundary layer control constitutes a well known process which have received multiple applications and uses. However, as far as we are aware, this process has never been used for spoiling the axial thrust produced by a jet issuing from a propulsive nozzle of a jet propulsion unit.

Another object of this invention is to provide a process which includes a new use of the known process of controlling the boundary layers of a flow by blowing fluid tangentially thereinto, this new use consisting in spoiling the axial thrust produced by a jet issuing from a propulsive nozzle of a jet propulsion unit.

In the accompanying drawings:

Figure 1 is a diagrammatic longitudinal section of a nozzle, illustrating the principle of the present invention.

Figure 2 is a similar section of a form of the invention.

Figure 3 is an end view of the nozzle shown in Figure 2.

In Figure 1, N is a nozzle having a converging section ABA'B' and an outlet bounded by outwardly curved, convex walls BC and B'C'. At a point of the wall ABC in the vicinity of the narrowest part BB' of the nozzle is a slot 1 facing outwardly and orientated in a direction substantially tangent to the curved wall BC. This slot 1 is supplied with pressure fluid through a duct 2.

When no fluid is supplied to the delivery slot 1, the high-velocity jet formed by the nozzle N issues therefrom in an axial direction shown by the arrow $f$. The boundary layers of the jet which are slowed down through contact with the walls of the nozzle, cause separation of the flow somewhere beyond but near the most restricted section BB'. Actually, the presence of a discontinuity such as the slot 1 formed in the wall of the nozzle promotes such a separation of the flow which will likely occur at this very slot 1.

If, on the contrary, pressure fluid is supplied to the slot 1, this fluid issues tangentially to the convex wall BC and its effect is to accelerate the relatively slow boundary layers of the jet and consequently to counteract its tendency to separate from the wall. In other words, the point of separation of the flow will be moved from 1 further along the outwardly curved, convex wall BC and possibly as far as its end C if the energy imparted to the boundary layers by auxiliary fluid is large enough. Therefore, the boundary layers of the jet will follow the curvature of the wall BC and issue in a direction shown by the arrow $d$ which makes a substantial angle with the undeflected direction $f$. These deflected boundary layers will bend the adjacent layers of the jet, and so on, by degrees, until the whole jet or a substantial portion thereof is eventually deflected.

Figures 2 and 3 illustrate a form of the invention allowing opposite, alternate or simultaneous deflection of the jet.

The nozzle N, which in the illustrated example is of rectangular cross section, comprises two delivery slots 1—1' located on opposite walls, at the outlet of the nozzle which carries opposite, convex extensions 3—3'. Each slot 1—1' communicates with a chamber 5—5' connected, through pipes 2—2' and valves V—V', with a source of pressure fluid which may conveniently be the air compressor of the jet propulsion unit.

When either of the valves, say V, is opened, pressure fluid is supplied to the corresponding chamber 5 and issues from the slot 1 tangentially to the convex extension 3. As described with reference to Figure 1, the jet is thereby deflected. The deflection, in the present example, will be effected upwardly of Figures 2-3. A downwards deflection may be achieved by opening the valve V', the valve V remaining closed.

When both the valves V—V' are simultaneously opened, the delivery slots 1—1' exert a symmetrical and opposite action on the jet which divides into two parts respectively deflected upwards and downwards.

The operation of one of the valves at a time will therefore give rise to a dissymetrical action on the jet, producing a lateral thrust component, i. e. a component perpendicular to the axis of the nozzle, and exerting a sheering moment of the apparatus powered by the jet propulsion unit. On the other hand, the simultaneous operation of the two valves V—V' will produce equal and opposite deflections, so that the lateral thrust components will cancel whereas the axial component is substantially reduced or even reversed to give rise to a braking action.

In order to enhance and stabilize the deflection, lateral guide vanes 4—4' are arranged beyond the outlet of the nozzle, outside the normal flow path of the jet and on opposite sides thereof. These vanes are spaced along this path and their action has been described in our co-pending application Serial No. 396,994.

The convex extensions 3—3' and the guide vanes 4—4' have been shown to extend through an arc ranging about 90° which is particularly convenient whenever a sheering action is aimed at. However, if it is merely desired to spoil the thrust and produce a braking action, the convex extensions 3—3' and the guide-vanes 4—4' will preferably extend through an arc ranging about 180°. In such a case, because of the magnitude of the deflection contemplated, two or more delivery slots such as 1—1' may be provided on each side of the nozzle, said slots being spaced and distributed along each extension 3—3'.

What we claim is:

1. A device designed for laterally deflecting a jet of motive gas issuing axially from a propulsive nozzle and comprising an outwardly curved, convex extension of a wall of said nozzle at the outlet thereof, means for blowing fluid along said convex extension in a direction substantially tangent thereto, a source of pressure fluid, piping means between said source and said blowing means, and valve means in said piping means for controlling the supply of pressure fluid to said blowing means.

2. A device as claimed in claim 1 wherein the nozzle comprises at least one planar wall, the convex extension is formed of a generally cylindrical segment and the blowing means comprises a rectilinear slot-like passage extending along a generatrix of said extension.

3. A device as claimed in claim 1 wherein the source of pressure fluid is an air compressor.

References Cited in the file of this patent

UNITED STATES PATENTS 2,491,610   Goddard _____ Dec. 20, 1949

FOREIGN PATENTS 928,469   France _____ June 2, 1947